Oct. 22, 1968
H. W. MURRAY
3,406,980
EXTENDABLE TRAILER
Filed July 7, 1966
4 Sheets-Sheet 1
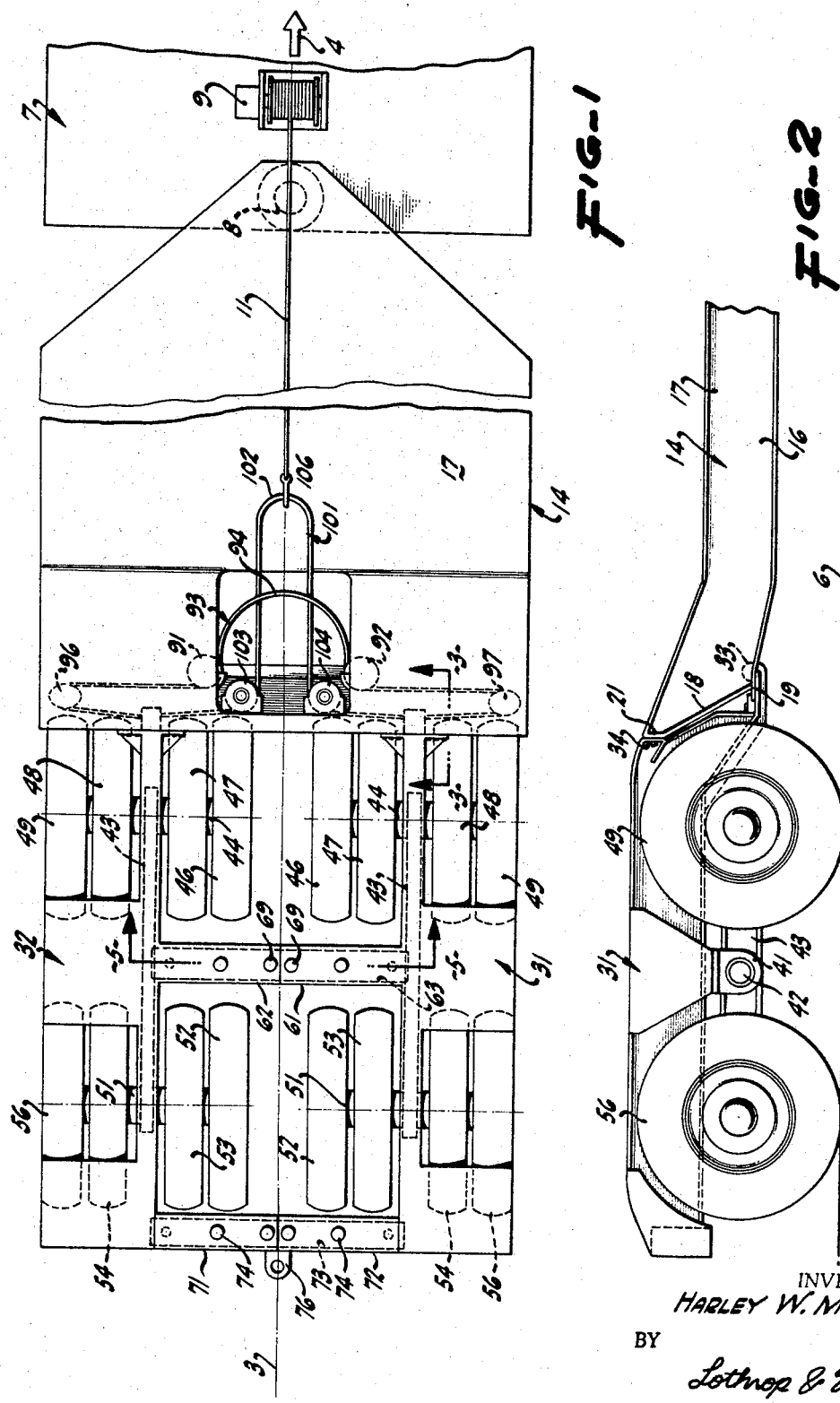
INVENTOR.
HARLEY W. MURRAY
BY
Lothrop & West
ATTORNEYS Oct. 22, 1968    H. W. MURRAY    3,406,980
EXTENDABLE TRAILER Filed July 7, 1966    4 Sheets-Sheet 2

INVENTOR.
HARLEY W. MURRAY
BY
Lothrop & West
ATTORNEYS

INVENTOR.
HARLEY W. MURRAY
BY
Lothrop & West
ATTORNEYS

Oct. 22, 1968  H. W. MURRAY  3,406,980
EXTENDABLE TRAILER
Filed July 7, 1966  4 Sheets-Sheet 4

INVENTOR.
HARLEY W. MURRAY
BY
Lothrop & West
ATTORNEYS

United States Patent Office 3,406,980
Patented Oct. 22, 1968

3,406,980
EXTENDABLE TRAILER
Harley W. Murray, 1754 E. Mariposa Road,
Stockton, Calif. 95206
Filed July 7, 1966, Ser. No. 563,513
2 Claims. (Cl. 280—34)

ABSTRACT OF THE DISCLOSURE

An extendable trailer having a main frame with a transversely extending cross member has subframes transversely slidable on and extending behind the cross member. Ground engaging wheels are mounted on the subframes and are moved transversely toward and away from each other to vary the trailer tread by an extending and retracting mechanism.

My invention relates to vehicles, particularly road vehicles, for use over the customary highways and is especially concerned with such a vehicle normally, although not necessarily, in the form of a trailer pulled by a tractor and designed to haul relatively heavy loads.

In many localities the use of highways is restricted in various ways in different hours, and one of the usual requirements is that vehicles used during the night be limited in width. It is, however, sometimes necessary to have an extra-width vehicle for use under certain load conditions, and in order to meet the various requirements in different places and at different times it has been customary to reload onto vehicles of different width or to employ special and delayed vehicle scheduling.

It is therefore an object of my invention to obviate the foregoing difficulties by providing a vehicle, particularly a trailer, that is laterally extendable and retractable so that the width thereof can be varied from time to time.

Another object of the invention is to provide an extendable trailer which readily can be changed from one width to the other with only a small amount of labor and supervision.

Another object of the invention is to provide an extendable trailer which in many respects is comparable to standard trailers now in use but has the added advantage of a variable width.

A still further object of the invention is to provide an extendable trailer in which the variation in width includes a variation in the tread or lateral positioning of the weight-bearing wheels.

Another object of the invention is to provide an extendable trailer which can be readily and quickly changed by a single operator from one width or position to another.

A still further object of the invention is in general to provide an improved extendable trailer.

Other objects together with the foregoing are attained in the embodiments of the invention described in the accompanying description and illustrated in the accompanying drawings, in which:

FIGURE 1 is a plan of an extendable trailer constructed pursuant to the invention, certain portions being broken away to reduce the size of the figure and other portions being shown in diagrammatic form;

FIGURE 2 is a side elevation of the structure illustrated in FIGURE 1;

Figure 5:
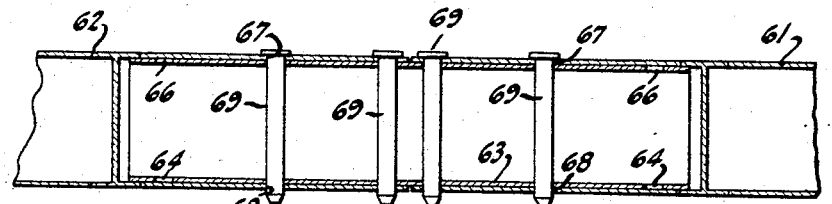
FIGURE 5 is a cross section, the plane of which is indicated by the line 5—5 of FIGURE 1.

The extensible vehicle pursuant to the invention can be embodied in a number of different forms, but has practically been embodied with success as a trailer in the forms shown herein. A vehicle pursuant to the invention is symmetrical about a central, longitudinal axis 3 and is especially designed to operate on the ground 6 or highway or comparable support in the direction of the arrow 4. The trailer is usually drawn behind a draft vehicle or tractor 7 similarly supported and provided with motive power transmitted through a hitch 8 interconnecting the draft vehicle and the trailer for appropriate conjoint motion. The tractor is also usually provided with a winch 9 or other mechanism for operating a cable 11 or the like. No details of this winch structure are shown since it is standard.

The trailer includes a main frame 14 comprised of the customary frame channels 16 and connecting members to support a generally horizontal bed 17. Particularly in accordance with the invention, the trailer main frame 14 adjacent its rearward portion is provided with a special transverse construction. This includes a cross wall 18 inclined somewhat to the vertical and extending for the width of the frame. Along the lower wall margin a flange 19 having exposed abutment surfaces (FIGURE 3) projects both ahead of and behind the wall 18 for substantially the full width of the vehicle. In addition, along its upper portion the cross wall 18 is provided with an upright wall 21 having a vertical abutment surface 22.

Designed to interengage with the main frame 14 are subframes 31 and 32. These are substantially identical and are normally located symmetrically on opposite sides of the central axis 3 so that the description of one applies equally to the other. The subframe 31, for example, at its lower, forward portion is provided with hooks 33 designed to curve around and engage with the abutment surfaces of the flange 19 in a transverse sliding relationship. Additionally, the subframe has an upper wall 34 extending transversely and provided with a vertical surface 36 designed to abut the abutment surface 22 of the main frame wall 21. Removable keepers 37 slidably engage the trailing portion of the flange 19 and are secured to the subframe by removable bolts 38. This arrangement is such that the weight of the main frame is transmitted to the subframe. Considered in a generally vertical direction the two frames are virtually one, but considered in a transverse or lateral direction the two frames are quite separate and can freely slide with respect to each other.

The subframe 31 includes a central saddle 41 provided with a transverse pivot pin 42 serving as the fulcrum of a support beam 43 extending equally ahead of and behind the fulcrum pin. At its forward end, the beam 43 carries a cross axle 44 at each end provided with dual wheels 46 and 47 on one side and 48 and 49 on the other. The connection between the axle 44 and the forward end of the beam 43 preferably is a pivotal one for relative motion about a longitudinal, horizontal axis. Similarly, the rear end of the beam 43 carries a cross axle 51 having a similar pivotal connection. At one side of the beam, ground-engaging wheels 52 and 53 are mounted and at the other side of the beam ground-engaging wheels 54 and 56 are mounted. With this arrangement, the various ground-engaging wheels are normally disposed with their axes of rotation extending transversely and parallel to the flange 19 and the walls 21 and 34.

Figure 6:
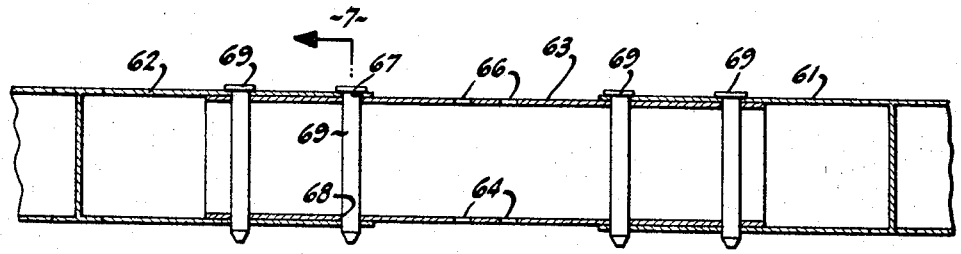
FIGURE 6 is a view similar to FIGURE 5 but showing the parts in an extended position.
Figure 7:
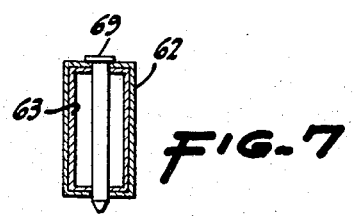
FIGURE 7 is a cross section, the plane of which is indicated by the line 7—7 of FIGURE 6.

The subframe arrangement is duplicated on opposite sides of the center axis 3 of the vehicle in a generally independent fashion, but for bracing and other reasons the two subframes 31 and 32 are preferably provided with interconnections rearward of the wall 34. For that reason, as particularly shown in FIGURES 5 and 6, for example, each of the subframes carries its own one of a pair of outriggers 61 and 62 in the shape of hollow or box beams disposed in alignment and directed toward each other. Situated within the interior of these beams is a smaller, floating or telescoping box beam 63 provided with a number of openings 64 and 66 designed to register with similar openings 67 and 68 in the outer beams. When selected ones of these openings are in vertical alignment, retaining pins 69 can be introduced therethrough to hold the parts immovable. When the pins are withdrawn, the parts can be telescoped with respect to each other and moved from their closest approach position as shown in FIGURE 5 into a spread-apart position as shown in FIGURE 6.

A duplicate arrangement is provided near the rear of the subframes and includes outriggers 71 and 72 of similar box and beam construction telescoped around an interior box beam 73. Similar retaining devices 74 are provided. In addition, if desired, a hitch connection 76 is afforded on the beam 73. When the various outriggers 61 and 62 as well as 71 and 72 are in a set position with the pins 69 and 74 engaged, the parts are held against any transverse motion and the subframes and the rest of the vehicle operate as a single, adequately rigid unit.

If desired, the parts can be held in any selected transverse position not limited to the positions established by the pins 69 and 74 since there is provided an additional holding means. The upper wall 34, for example, carries a number of bolts 78 which extend through the vertical wall 21, passing through a transversely elongated slot 79 therein. The bolts have nuts 81 in threaded engagement therewith in the usual fashion. When the parts are to be held in position, all of the nuts 81 are tightened so that the wall surfaces 22 and 36 are clamped firmly together. This precludes any lateral shifting of the parts and makes in effect a single frame unit. If the position happens to be appropriate, the pins 69 and 74 can be used too, but if an intermediate position is chosen, the tightened bolts 78 and nuts 81 can be relied on. Under all normal operating circumstances, however, the nuts 81 are backed off slightly so that the bolts 78 do not grip or bind. The walls 21 and 34 are unrestricted laterally and are freely slidable with respect to each other. In practice, lubricant is usually applied between them and is interposed as well between the flange 19, the hooks 33 and the keepers 37.

Figures 3, 4:
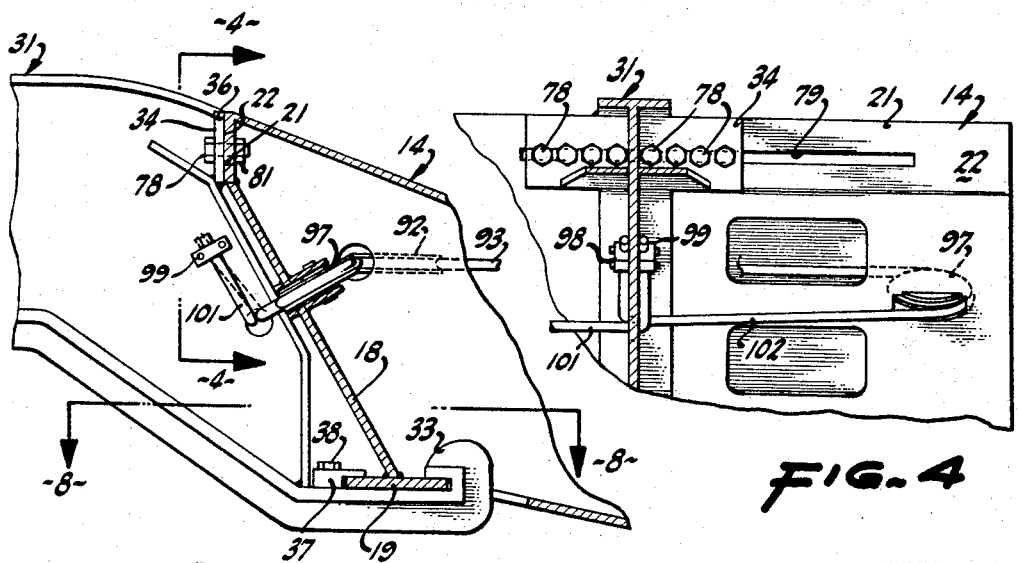
FIGURE 3 is a cross section in detail and to an enlarged scale, the plane of section being indicated by the line 3—3 of FIGURE 1.
FIGURE 4 is a cross section to the scale of FIGURE 3 showing a fragment of the construction, the plane of section being indicated by the line 4—4 of FIGURE 3.
Figure 8:
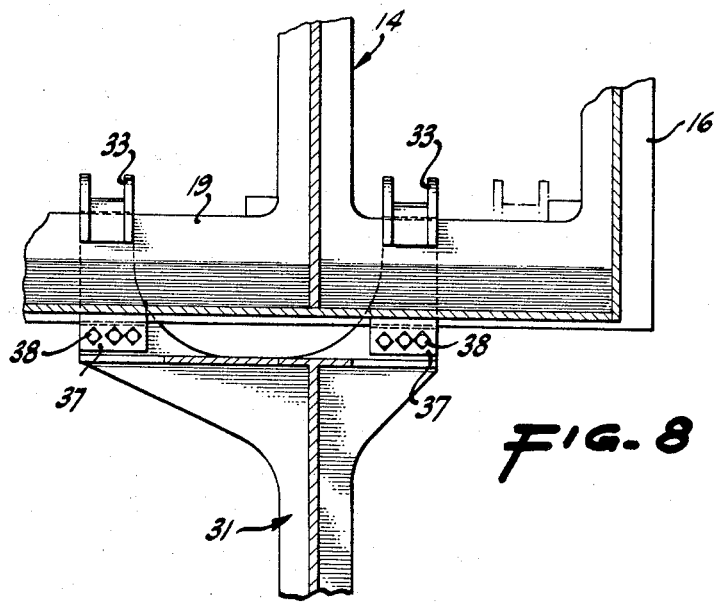
FIGURE 8 is a cross section, the plane of which is indicated by the line 8—8 of FIGURE 3.

Means are provided for transversely sliding the subframes with respect to the main frame. For this reason, a first pair of sheaves 91 and 92 is mounted on the main frame 14 in position to carry a first cable 93 in a loop 94 and to direct the cable around a pair of idler sheaves 96 and 97 also on the main frame. The opposite ends of the cable 93 are secured to the subframes 31 and 32 respectively by cable clamps 98, as shown in FIGURE 4. A second cable 101 having a loop 102 therein passes around a second pair of sheaves 103 and 104 on the main frame and then has its opposite ends directly anchored to the subframes 31 and 32 by clamps 99.

With this arrangement, when all of the bolts 78 are relatively loose and the various pins 69 have been withdrawn, the cable 11 is connected to the appropriate one of the loops 94 or 102 by means of a detachable hook 106. In order to expand the subframes with respect to the main frame; that is to say, to spread them apart transversely and increase the tread at the rear of the trailer, the hook is attached to the loop 94 and the winch 9 is operated to take in the cable 11. Preferably this operation takes place as the vehicle is moving, either forwardly or rearwardly. Taking in of the cable 93 is effective to draw the subframes 31 and 32 apart laterally. During this time the surfaces 22 and 36 slide with respect to each other and the hooks 33 and keepers 37 slide on the flanges 19. Also, the outriggers 61 and 62 and 71 and 72 slide with respect to and on the interior beams 63 and 73 both in the center of the rear structure and at the rear end thereof.

Figure 9:
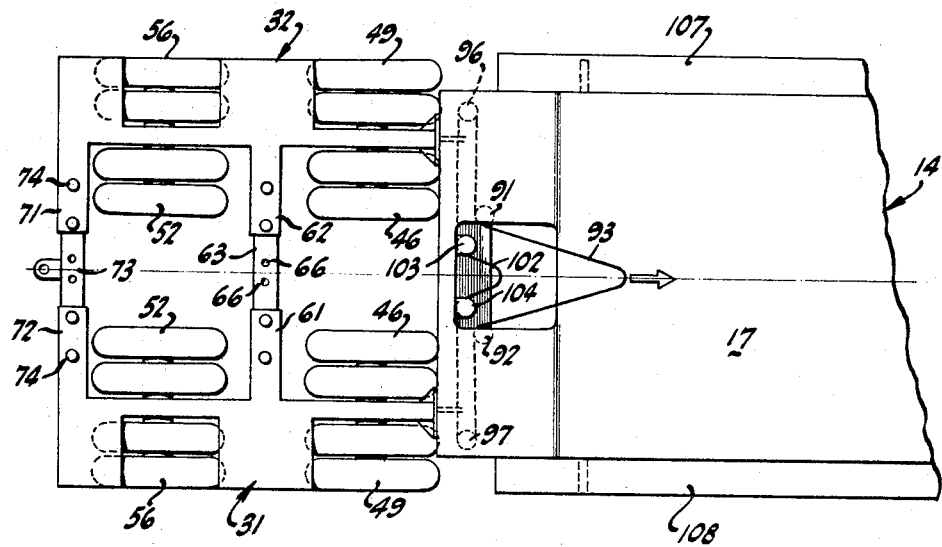
FIGURE 9 is a plan to a reduced scale showing the mechanism of FIGURE 1 in an extended position.

When the tread has been established at its new spread value, the pins 69 and 74 are dropped into the then-registering holes. If the pull on the cable 93 is continued long enough, the subframes are moved transversely to their maximum spread position as shown in FIGURE 9. The loop 94 can then be detached from the hook 106 and the trailer utilized for hauling. Often, under these conditions of widened tread, it is helpful also to extend outrigger panels 107 and 108 alongside the main frame bed 17 in order to accommodate additional load, although this is not necessary.

When the wider tread is no longer desired, any engaged pins 69 and 74 are removed and the hook 106 is extended to the cable loop 102. The winch 9 is again activated to take in the cable 11 and the subframes 31 and 32 are drawn toward each other to the desired extent. If they are brought into closest abutment, as shown in FIGURE 1, the various pins 69 and 74 can then be reinserted in the newly aligned holes. During the transverse or lateral movement of the rear wheels, it is preferably to have the vehicle moving rearwardly or forwardly since then the tires do not have to be slid frictionally across the ground, but more readily roll into their new positions. It has been found in practice that a relatively small force is requisite on the cable 11 to effectuate either of the movements of the subframes outwardly or inwardly if the vehicle is at the same time advancing or reversing.

With this arrangement the tread of the trailer can be varied from time to time, not only to accommodate the load, but also to conform to any regulations as to maximum width.

Figure 10:
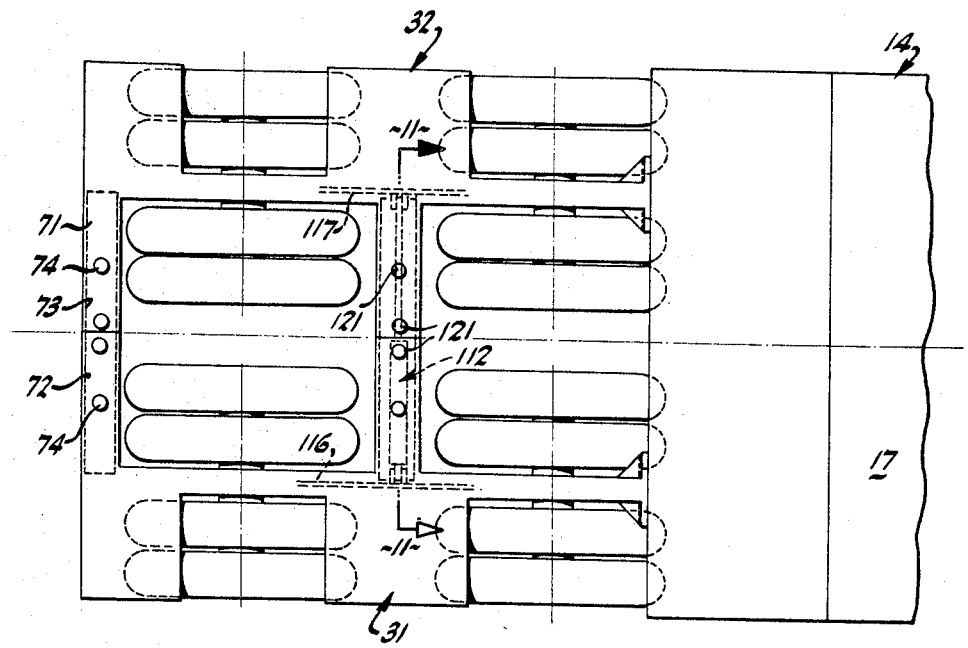
FIGURE 10 is a plan similar to FIGURE 1 but showing a modified form of mechanism.
Figure 11:
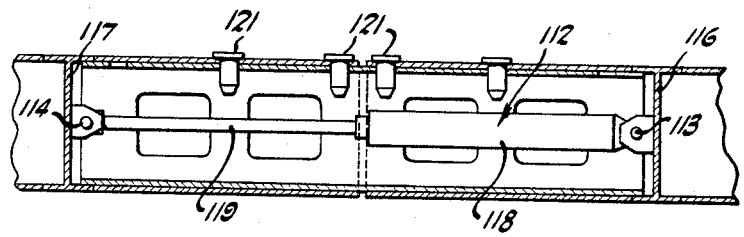
FIGURE 11 is a cross section, the plane of which is indicated by the line 11—11 of FIGURE 10.

In some instances it is desired to produce substantially the same result of widening and narrowing the trailer, but to use something other than the cable mechanism since in some installations there is no winch 9 available on the tractor vehicle. Under these circumstances, an arrangement as shown in FIGURES 10 and 11 is employed. The construction is about as previously described except for the cable and sheave arrangement. Instead, a hydraulic jack 112 is disposed, preferably by hinge pins 113 and 114, between walls 116 and 117 in one pair of the outriggers, preferably the forward outriggers. The hydraulic jack includes a cylinder 118 and a piston rod 119 reciprocable therein in a transverse direction. The customary hydraulic connections, valving and pressure fluid source are afforded but are not illustrated since they are standard. If desired, locking pins 121 may be provided, but these are relatively short in order not to interfere with the hydraulic mechanism. The pins 121 can in some cases be dispensed with if the hydraulic fluid within the jack 112 serves by appropriate valving to lock the parts in any selected transverse position. As before, when the jack 112 is extended, the wheels are spread apart, and when the jack is retracted, the wheels are likewise drawn together, it being preferable as before to move the trailer during this operation.

What is claimed is:

1. An extendable trailer comprising a main frame including a transversely extending cross member, a subframe, means for mounting said subframe on said main frame in weight supporting relationship therewith and for transverse sliding thereon, a ground-engaging wheel, means for mounting said wheel on said subframe against transverse movement relative thereto and for rotation relative thereto about a transverse axis, a pair of sheaves, means for mounting said sheaves on said main frame, a first cable trained around one sheave and connected to said subframe to exert a pull thereon in one transverse direction, and a second cable trained around the other sheave and connected to said subframe to exert a pull thereon in the opposite transverse direction.

2. An extendable trailer comprising a main frame including a transversely extending cross member, a subframe, means for mounting said subframe on said main frame in weight supporting relationship therewith and for transverse sliding thereon, a ground-engaging wheel, means for mounting said wheel on said subframe against transverse movement relative thereto and for rotation relative thereto about a transverse axis, a lower transverse flange on said cross member with the edge of said flange disposed in a forward direction, a substantially vertical first transverse surface on said cross member above said flange, a transverse hook on said subframe extending forwardly in slidable engagement with said flange edge, and a substantially vertical second transverse surface on said subframe in slidable engagement with said first transverse surface.

References Cited
UNITED STATES PATENTS 2,491,044 12/1949 Holland _____ 280—34
2,900,194 8/1959 De Lay _____ 280—34

LEO FRIAGLIA, *Primary Examiner.*

J. SIEGEL, *Assistant Examiner.*